United States Patent [19]

DeTrano et al.

[11] Patent Number: 5,128,392
[45] Date of Patent: Jul. 7, 1992

[54] ACCELERATOR SYSTEM FOR PEROXIDE BASED CURING SYSTEMS

[75] Inventors: Mario N. DeTrano, Massillon; William L. Hergenrother, Akron; Donald B. Diehl, Barberton, all of Ohio

[73] Assignee: Bridgestone/Firestone, Inc., Akron, Ohio

[21] Appl. No.: 232,184

[22] Filed: Aug. 15, 1988

Related U.S. Application Data

[63] Continuation of Ser. No. 549,946, Nov. 9, 1983, abandoned, which is a continuation of Ser. No. 83,113, Aug. 10, 1987, abandoned.

[51] Int. Cl.⁵ .............................................. B29C 73/00
[52] U.S. Cl. ................................... 523/166; 524/113; 524/173; 524/205; 524/233; 524/306; 524/359; 524/360; 524/381; 524/416; 524/525
[58] Field of Search ............... 523/166; 524/381, 525, 524/359, 360, 416, 205, 113, 233, 173, 306

[56] References Cited

U.S. PATENT DOCUMENTS

| | | | |
|---|---|---|---|
| 3,378,508 | 4/1968 | Hamed et al. | 260/5 |
| 4,331,581 | 5/1982 | Davison | 524/364 |
| 4,360,620 | 11/1982 | Lindner et al. | 524/234 |
| 4,387,044 | 6/1983 | Sanchez et al. | 525/386 |
| 4,426,468 | 1/1984 | Ornums et al. | 524/525 |
| 4,445,562 | 5/1984 | Bohm et al. | 152/347 |

FOREIGN PATENT DOCUMENTS 565210 8/1975 Switzerland.

*Primary Examiner*—Joseph L. Schofer
*Assistant Examiner*—N. Sarofim
*Attorney, Agent, or Firm*—Daniel N. Hall

[57] ABSTRACT

The present invention relates to filled elastomers which can be cured at low temperatures utilizing a quinoid/peroxide curing system in the presence of a select polar solvent accelerator. The select solvent accelerators which are utilized have the dual function of acting as both dispersing agents and curing accelerators. The instant invention herein includes the instant curing system, its use in a tire sealant composition, the puncture-sealing layer formed of the cured composition and the puncture-sealing tire.

7 Claims, No Drawings

ACCELERATOR SYSTEM FOR PEROXIDE BASED CURING SYSTEMS

CROSS REFERENCE TO RELATED APPLICATIONS

The application is a continuation of U.S. Ser. No. 083,113 filed Aug. 10, 1987, now abandoned which in turn is a continuation of U.S. Ser. No. 549,946 filed Nov. 9, 1983, now abandoned.

BACKGROUND OF THE INVENTION

Proper dispersion and distribution of curing agents in a rubber stock are desirable in order to obtain an efficient and homogenous cure. Although sufficient dispersion can usually be achieved with liquid curing agents, the use of such liquid agent is often inconvenient because of their instability and tendency to phase separate. While these problems can be avoided through use of solid curing agents, it is often essential to adequately subdivide and disperse such solid agents particularly when they are not appreciably soluble in the rubber stock. Exemplary solid curing agents for use with butyl rubber stock include p-benzoquinonedioxime and benzoyl peroxide on excipient bases such as calcium phosphate, flour and the like. When such curing systems are used in butyl rubber systems and heated to mild temperatures, below 50° C., the butyl rubber undergoes an excessively slow cure which results in a product having a low cross-link density. Therefore, it is often desirable to use an accelerator with such solid dispersed systems.

It is an object of the present invention to provide selected quinoid/peroxide based curing systems which are capable of yielding fast cure rates at mild temperatures particularly in the presence of selected accelerators.

It is a further object of the present invention to provide a curing system capable of yielding fast cures in certain rubber stocks under mild temperature conditions. Therefore the main advantages of the utilization of the curing system of the present invention are as follows: (1) energy consumption can be minimized by effecting cure at mild instead of high temperature; (2) fast cure cycles are obtained which can translate into faster production times thus resulting in a more efficient, profitable commercial operation; and (3) the use of mild temperature curing can enable rubber parts to be produced which have physical properties which are preserved. These properties might have been adversely affected in the past when the parts were subjected to high temperature curing conditions.

It is a further object of the present invention to utilize the selected quinoid/peroxide based curing systems in the preparation of a puncture-sealing layer of puncture-sealing tires.

SUMMARY OF THE INVENTION

It has now been discovered that filled elastomers can be cured at low temperatures utilizing a quinoid/peroxide curing system in the presence of a select polar solvent accelerator. The select solvent accelerators which are utilized have the dual function of acting as both dispersing agents and curing accelerators. The instant invention herein includes the instant curing system, its use in a tire sealant composition, the puncture-sealing layer formed of the cured composition and the puncture-sealing tire.

DESCRIPTION OF THE INVENTION

According to the present invention, there is provided a process for curing an elastomer composition comprising at least one elastomeric synthetic or natural polymer at a temperature ranging from about 10° C. to about 200° C., typically about 50°–100° C. which comprises carrying out the curing in the presence of about 0.01 to 20 parts by weight of at least one solid organic peroxide compound about 0.1 to 20 parts by weight of a select polar solvent accelerator and about 0.01 to 10 parts by weight of at least one quinoid vulcanization accelerator per 100 parts by weight of elastomer composition (phr).

The curing system of the present invention is especially advantageous as it can be utilized to cure rubber based systems at low temperatures ranging from about 20° C. to 100° C., preferably from 50° C. to 100° C.

The polymers which can be utilized in the present invention are unsaturated and contain a minimum of about 0.1 mole % unsaturation. Typically, these polymers have a Mooney viscosity of at least about 25 ($ML_4$/100° C.). Representative useful elastomeric polymers include, but are not limited to: natural rubber, butyl rubber, ethylene-propylene terpolymer, polybutadiene, butadiene-styrene copolymers, butadiene-acrylonitrile copolymers, polyisoprene, isoprene-butadiene copolymers, hydrogenated or halogenated rubbers, and mixtures thereof.

The present invention relates to accelerated cure systems for these rubbers which utilize peroxide and quinoid curing agents which are solid or impregnated on solid fillers in conjunction with select polar solvent accelerators. In a preferred mode of the instant invention, the quinoid vulcanizing accelerator is mixed with the rubber masterbatch prior to sequential or concurrent addition of the peroxide curing agent and the select polar solvent accelerator. Alternatively the peroxide curing agent, quinoid vulcanizing agent and the select polar solvent can be added in any order or conjointly.

Typical organic peroxides which can be utilized in the curing system of the present invention include but are not limited to: benzoyl peroxide, t-butyl peroxypivalate, 2,4-dichloro-benzoyl peroxide, decanoyl peroxide, propionyl peroxide, hydroxyheptyl peroxide, cyclohexanone peroxide, 2,5-dimethylhexyl-2,5-di(peroxybenzoate), t-butyl perbenzoate, dicumyl peroxide, 2,5-dimethyl-2,5-di(t-butylperoxy)hexyne-3,2,5-dimethyl-2,5-di(t-butylperoxy)hexane, 2,5-dimethyl-2,5-di(benzoylperoxy)hexane, di-t-butyl peroxide, p-menthane hydroperoxide, cumene hydroperoxide, 2,5-dimethyl-2,5-di(hydroperoxy)hexane, t-butyl hydroperoxide, lauroyl peroxide, t-amyl perbenzoate, or mixtures thereof. Preferred organic peroxides are benzoyl peroxide and t-butyl perbenzoate. Mixtures of two or more of the above peroxides can also be used. Other useful peroxide curing agents are known to those skilled in the art.

It is usually desirable to support the peroxide curing agent on an inert filler or excipient material for reasons of safety and convenience in handling.

Typical excipient materials which can be utilized as solid supports for the above-identified peroxide curing agents include wheat starch bases and inorganic phosphate bases.

Typical commercially available supported peroxides which may be utilized in the instant invention include: LUPERCO AA from Pennwalt Chemicals which is 32% benzoyl peroxide impregnated on a wheat starch base; and LUPERCO ACP from Pennwalt Chemicals which is 35% benzoyl peroxide impregnated on an inorganic phosphate base. As is well known to those of skill in the art, peroxides such as those described above, should be handled with the upmost care whether they be pure, supported on inert filler or combined with polymer. The tendency of peroxides to decompose or react violently requires the exercise of care and skill in their use and the skilled artisan will thoroughly familiarize himself with their properties before employing them.

It is necessary to conjointly utilize a solid quinoid vulcanizing accelerator together with the peroxide curing agents. Suitable quinoid compounds include p-quinonedioxime, p-quinone dioxime diacetate, p-quinone dioxime dicaproate, p-quinone dioxime dilaurate, p-quinone dioxime distearate, p-quinone dioxime dicrotonate, p-quinone dioxime dinaphthenate, p-quinone dioxime succinate, p-quinone dioxime adipate, p-quinone dioxime difuroate, p-quinone dioxime dibenzoate, p-quinone dioxime di(o-chloro benzoate), p-quinone dioxime di-(p-chloro benzoate), p-quinone dioxime di-(p-nitro benzoate), p-quinone dioxime di-(m-nitro benzoate), p-quinone dioxime di-(3,5 dinitro benzoate), p-quinone dioxime di-(p-methoxy benzoate), p-quinone dioxime di-(n-amyl oxy benzoate), p-quinone dioxime di-(m-bromo benzoate), p-quinone dioxime di-(phenyl acetate), p-quinone dioxime di-cinnamate, p-quinone dioxime di-(n-phenyl carbamate), bis ethoxy methyl ether of quinone dioxime, mono-zinc salt of quinone dioxime, di-zinc salt of quinone dioxime, zinc chloride double salt of quinone dioxime, mono mercury salt of quinone dioxime, di-mercuric salt of quinone dioxime, mercuric chloride double salt of quinone dioxime, mono-barium chloride double salt of quinone dioxime, mono-cupric salt of quinone dioxime, mono-lead salt of quinone dioxime, mono-barium salt of quinone dioxime, mono-magnesium salt of quinone dioxime, mono-calcium salt of quinone dioxime, silver salt of p-quinone dioxime, 1,4-naphthoquinone dioxime, chloro methyl quinone dioxime, 2,6-dimethyl 1,4-quinone dioxime, 2-phenyl-1,4-quinone dioxime, 2-benzyl-1,4-quinone dioxime, 2-ethyl-1,4-quinone dioxime, thymo quinone dioxime, 2-chloro-p-quinone dioxime, thymo quinone dioxime dibenzoate, thymo quinone dioxime diacetate, p-quinone dioxime phosphochloride, and the like, and mixtures thereof.

The inert fillers or excipient materials consist of particles having an average maximum particle size of 50 microns. The preferred particle size of inert fillers for use in the instant invention are particles less than ten microns, most preferably averaging between one and five microns in diameter. The solid peroxides and quinoids which are employed in the present invention each consist of particles having an average maximum particle size below 50 microns, preferably below ten microns, and most preferably between one and five microns.

Additional vulcanizing and co-curing agents can additionally be incorporated into the rubber mix. Suitable vulcanizing and co-curing agents which can be utilized in the instant invention include but are not limited to: sulfur and sulfur-containing vulcanizing agents such as tetrathiuram disulfide and dipentamethylene thiuram tetrasulfide; vulcanization accelerators such as thiuram compounds, dithioacid salts and thiazole compounds.

Typical amounts of peroxides utilized in the present invention are from about 0.01 to 20, preferably from about 0.5 to 10 phr. The total amount of vulcanization agents and/or co-curing agents which are generally used are amounts ranging from about 0.01 to 20 phr. Quinoid compounds are typically utilized in amounts ranging from about 0.01 to 10 phr. The select polar solvent accelerators described below in detail are typically used in amounts ranging from about 0.1 to 20, preferably about 0.5 to 5 phr.

In the present invention it is preferred that the peroxide curing compounds be either predispersed in a select polar solvent accelerator prior to incorporation into the rubber stock, or sequentially or conjointly added into the rubber masterbatch after the addition of the select polar solvent accelerator.

Suitable select polar solvent accelerators include but are not limited to: water (including aqueous solutions of acids and bases such as shown in Table 2), primary, secondary and tertiary alcohols and polyols such as aliphatic, cycloaliphatic and aromatic alcohols containing from one to twelve carbon atoms, for example, methanol, ethanol, propanol, butanol, n-octanol, n-heptanol, n-hexanol, iso-octanol, 2,2-dimethyl-hexan-6-ol, t-amyl alcohol, 4-methyl cyclohexanol, benzyl alcohol, butanediol, propylene glycol and ethylene glycol; ketones, such as ethyl methyl ketone and cyclohexanone; aldehydes such as benzaldehyde, acetaldehyde and propylaldehyde; ethers such as tetrahydrofuran, dioxane, dioxalane and diethyl ether; alkyl and aromatic nitriles such as propylnitrile and benzonitrile; acids such as phosphoric acide, acetic acid and proprionic acid; and bases such as NaOH; esters such as dimethyl succinate and diethyl succinate. Dipolar, aprotic compounds such as dialykyl formamides, dialkyl acetamides and dialkylsulfoxides such as dimethylsulfoxide are also useful. Mixtures of these accelerators can be utilized.

The curing system of the instant invention can be utilized in the formation of a puncture-sealing layer of a puncture-sealing tire. This puncture-sealing layer is located on the inner surface of a tubeless tire either on the innermost surface or between the carcass and another layer with the puncture-sealing layer consisting essentially of a cured composition formed from ingredients comprising:

(a) a network-forming amount of a network-forming polymer elastomer containing at least about 0.1 mole % unsaturation, (b) a tackifying amount of a primary tackifier polymer, preferably a liquid polybutene, having a number average molecular weight ranging from about 500 to about 5000, (c) the curing system of the instant invention. For example, typical amounts of (a) and (b) are about 100 pbw and about 525 pbw, respectively.

The puncture-sealing tire herein has a puncture-sealing layer which resists migration, provides a high degree of adhesion, and resists blow through.

The aforementioned cured composition can be produced independent of a tire and sold to tire manufacturers for use in the manufacture of puncture-sealing tires. Moreover, the aforementioned ingredients can be sold in the form of a sealant system to tire manufacturers who use the system to produce said cured composition.

Typical network-forming polymers include EPDM polybutadiene, hydrogenated polybutadiene, butyl rubber, halo butyl rubber (e.g. chloro- and bromo-), acrylonitrile-butadiene copolymer, styrene butadiene copolymer, natural rubber, cis-polyisoprene and the like. Mixtures of two or more of the above polymers can also be used.

The primary tackifier polymers used in the invention are polymers of relatively low molecular weights ($\overline{Mn}$ about 500 to about 5000) which often, but not necessarily are liquid at room temperature (about 20° C.). Many structural types of polymers are useful including ethylene-propylene copolymer (EPC), ethylene-propylenediene terpolymer, polybutadiene (PBD), hydrogenated PBD, butyl rubber (BR), polypropylene, acrylonitrile-butadiene copolymer (ANB), styrene-butadiene rubber (SBR), depolymerized natural rubber (DPR) and polybutenes. Because of their cost, availability and properties the polybutenes are particularly useful.

Such polybutenes preferably have a number average molecular weight exceeding about 1000 as this has an effect on minimizing the possibility of its migration into adjacent tire components. While the primary tackifier can be utilized in an amount of at least about 300 phr, typically it is utilized in an amount ranging from about 300 to about 900 phr. It is preferably prepared by polymerizing an isobutylene rich stream with a metal halide catalyst and preferably has a polymer backbone structure resembling polyisobutylene. Very suitable polybutenes are available under the trademark Indopol, e.g. Indopol H-300 and Indopol H-1900, from Amoco. The manufacturer indicates that these Indopols have a polymer backbone structure resembling isobutylene and that Indopol H-300 has a viscosity ranging from about 627 to 675 centistokes at 100° F. (ASTM D-445) and Indopol H-1900 has a viscosity ranging from 4069 to 4832 centistokes at 100° F. (ASTM D-445). The number average molecular weights ($\overline{Mn}$) of these materials are about 1290 to 2300, respectively, as determined by vapor pressure osmometry.

Additional ingredients for use in preparation of the sealant layer are disclosed in the application of DeTrano et al. titled "EPDM-Based Sealant Compositions And Puncture-Sealing Tires Containing Same" filed concurrently herewith which is herein incorporated by reference.

Utilization of the instant improved rubber curing system is displayed in the following Examples 1 through 30.

PREPARATION OF RUBBER MASTERBATCH FOR EXAMPLES

A butyl rubber masterbatch was formed from 15 parts by weight of a commercial grade of butyl rubber, 78 parts by weight of polyisobutylene containing 5 parts by weight of a commercially available aliphatic resin tackifier (Piccotac B-BHT), 7 parts by weight of reinforcing grade carbon black, and 0.55 parts by weight of solid p-benzoquinonedioxime. Examination was made on the representative vulcanization system with or without various polar solvent vulcanization accelerators and peroxide curing agents in the following examples.

EXAMPLES 1 THROUGH 4 AND CONTROL 5

Samples of the butyl rubber masterbatch were blended in a Brabender mixer operating at 60 rpm at a stock temperature at 35°–40° C. Examples 1 through 4 shown in Table 1 display the effect of a select polar solvent, 1-octanol, upon the curing rate of the butyl rubber masterbatch further containing a peroxide curing agent. Control 5 is a comparative Example displaying the curing of the butyl rubber masterbatch with a peroxide curing agent in the absence of 1-octanol, the select polar solvent.

EXAMPLES 6–28

For each of the following Examples 6–28, 100 parts by weight of the butyl rubber masterbatch was charged into a Brabender mixer operating at 60 rpm at ambient temperature. The rubber stock temperatures rose to between 35° and 40° C. during mixing. In Examples 6 through 24 a select polar solvent accelerator in an amount of 5.15 parts by weight was added to the rubber stock and mixed for three minutes. Thereafter 7.35 parts by weight of LUPERCO AA, a peroxide curing agent, was sequentially added to the mixture of rubber and accelerator. The cure onset time, $T_1$, for each mixture was recorded in minutes as the time at which curing occurred after blending. The Brabender mixer registers the torque during mixing of the rubber composition in units of meter-grams. The time $T_2$ was then recorded at which the torque measurement increased by 100 meter-grams from the lowest torque measurement recorded during mixing of the rubber composition after the addition of both the peroxide curing agent and the select polar solvent accelerator.

The cure rate index, $T_2-T_1$, was calculated for each select polar solvent accelerator utilized. The results are demonstrated in Table 2.

Most of the cured rubber stocks produced in Examples 6 through 23 were given a hot flow test, the results of which are displayed in Table 2. In all hot flow tests, a 0.5 to 0.55 gram sample of cured rubber stock was placed on acetone-cleaned, microscope slide inclined at an angle of 30°. The distance which the test stock flowed down the glass slide after two hours at 150° C. was measured in millimeters. These samples were not post heated and the results are listed in Table 2 under "After Mixing" as the samples were directly removed from the Brabender mixer. Similarly a 0.5 to 0.55 gram sample of each cured rubber stock was post, heated for 30 minutes at 80° C. in an oven and given the same flow test. The results of this test are shown in Table 2 under the column heading "Post Heated".

Examples 25 through 28 shown in Table 3 display the use of polar solvents which cannot be utilized in the present invention as the Brabender tests displayed a rate cure index greater than 6.0. Plus signs after number in Table 3 display that no further measurements were taken after that time or distance.

TABLE 1

| Example No. | Butyl Rubber Master Batch Parts By Weight | Peroxide Curing Agent Parts By Weight | 1-Octanol[3] Parts By Weight | Cure Onset Time (Minutes) | $V_R^{(4)} \times 10^2$ MEASURED AFTER MINUTES AT 80° C. POST CURING | | | |
|---|---|---|---|---|---|---|---|---|
| | | | | | Initial Mixing | 15 Min. | 30 Min. | 60 Min. |
| 1 | 100 | 7.35[1] | 5.15 | 5 | 1.22 | 1.39 | 1.14 | 1.12 |
| 2 | 100 | 7.1[2] | 5.15 | 4 | 1.42 | 1.57 | 1.19 | 1.20 |
| 3 | 100 | 7.1[2] | 2.58 | 6.5 | 1.13 | 1.07 | 1.20 | 1.11 |
| 4 | 100 | 7.1[2] | 1.29 | 9 | 0.48 | 0.90 | 0.89 | 0.83 |

TABLE 1-continued

| | Butyl Rubber | Peroxide Curing | 1-Octanol[3] | | $V_R^{(4)} \times 10^2$ MEASURED AFTER MINUTES AT 80° C. POST CURING | | | |
|---|---|---|---|---|---|---|---|---|
| | Master Batch | Agent | Parts By | Cure Onset | Initial | | | |
| Example No. | Parts By Weight | Parts By Weight | Weight | Time (Minutes) | Mixing | 15 Min. | 30 Min. | 60 Min. |
| Control 5 | 100 | 7.1[2] | none | 28−[5] | Dissolved[6] | Dissolved[6] | Dissolved[6] | Dissolved[6] |

[1]32% benzoyl peroxide with wheat starch excipients (Pennwalt Chemicals)
[2]35% benzoyl peroxide with calcium phosphate excipients (Pennwalt Chemicals)
[3]Alfol 8 (Conoco Chemicals)
[4]Crosslink density, i.e., volume fraction of rubber remaining in the swollen sample
[5]No curing displayed after 28 minutes
[6]Sample did not cure and therefore dissolved in solvent

TABLE 2

| | | Brabender Plasticorder Response | | | Hot Flow Index[2] | |
|---|---|---|---|---|---|---|
| | | | | | After | Post |
| Example No. | Select Polar Solvents | $T_1$ | $T_2$ | $T_2 - T_1$ | Mixing | Heated |
| 6 | Dimethylformamide | 0.4 | 1.3 | 0.9 | No Flow | No Flow |
| 7 | Dimethylacetamide | 0.7 | 1.4 | 0.7 | No Flow | No Flow |
| 8 | Acetic Acid | 1.2 | 1.9 | 0.7 | No Flow | No Flow |
| 9 | Dimethylsulfoxide | 1.5 | 2.6 | 1.1 | No Flow | 0.50 |
| 10 | Benzyl Alcohol | 1.0 | 2.2 | 1.2 | 0.50 | 0.62 |
| 11 | Benzonitrile | 6.2 | 9.9 | 3.7 | 0.25 | 0.32 |
| 12 | Cyclohexanone | 6.0 | 10.0 | 4.0 | 0.31 | 0.54 |
| 13 | Butanediol | 3.5 | 6.2 | 2.7 | 0.67 | 1.62 |
| 14 | 1% Sodium Hydroxide[1] | 6.7 | 9.7 | 3.0 | Not Tested | Not Tested |
| 15 | 1% Phosphoric Acid[1] | 6.2 | 9.9 | 3.7 | Not Tested | Not Tested |
| 16 | Acetophenone | 6.0 | 11.4 | 5.4 | 0.31 | 0.77 |
| 17 | t-Amyl Alcohol | 6.0 | 10.7 | 4.7 | 0.94 | 1.46 |
| 18 | 4-Methyl Cyclohexanol | 6.0 | 11.5 | 5.5 | 0.94 | 1.23 |
| 19 | Benzaldehyde | 6.5 | 10.5 | 4.5 | 1.00 | 1.92 |
| 20 | Diethylsuccinate | 6.5 | 12.0 | 5.5 | 0.87 | 1.00 |
| 21 | Water[1] | 7.5 | 11.5 | 4.0 | Not Tested | Not Tested |
| 22 | Water | 7.0 | 12.0 | 5.0 | Not Tested | Not Tested |
| 23 | 1-Octanol | 6.7 | 11.9 | 5.2 | 1.00 | 1.00 |
| 24 | 42.5% Phosphoric Acid[1] | 9.0 | 13.5 | 4.5 | Not Tested | Not Tested |

[1]Accelerator present at the 0.74 wt. percent level
[2]Index relative to Example 23 = 13 mm Flow

TABLE 3

| | | Brabender Plasticorder Response | | | Hot Flow Test | |
|---|---|---|---|---|---|---|
| | Select | | | | After | Post |
| Example No. | Polar Solvent | $T_1$ | $T_2$ | $T_2 - T_1$ | Mixing | Heated |
| 25 | Dodecylmercaptan | 2.5 | 20− | 20− | 1.00 | 1.23 |
| 26 | Nitrobenzene | 9.5 | 18.0 | 8.5 | 1.19 | 1.31 |
| 27 | Dimethylaniline | 20+ | — | — | 3+ | 3+ |
| 28 | None | 20− | — | — | Not Tested | Not Tested |

The following Examples 29 and 30 display the utilization of the instant curing system in the preparation of a puncture-sealing layer of a puncture-sealing tire.

| | Example 29 | Example 30 |
|---|---|---|
| EPDM (EPsyn 55) | 15 | 15 |
| Polybutene (Indopol H-1900) | 85 | 50.5 |
| Polybutene (Indopol H-300) | — | 29 |
| Resin Tackifier (Piccotac B-BHT) | — | 5.5 |
| Carbon Black (N-326) | 5 | 5 |
| p-benzoquinonedioxime | 1 | 1 |
| Peroxide Catalyst consisting by weight of 50% LUPERCO AA, 17.3% n-octanol, and 32.7% Indopol H-300 | 14.4 | 14.4 |

These compositions were prepared as follows: A masterbatch of the EPDM, 5 parts of the Indopol H-1900, the carbon black and the p-benzoquinonedioxime was prepared in a Brabender Plasticorder operating at 60° C. and 60 rpm. The resultant mix was then worked on a two-roll mill. The batch was then solution blended in hexane with the remainder of the polybutene and other tackifier (if any) and was subsequently stripped of solvent in a vacuum oven to produce a dried material. The Peroxide Catalyst was then added to the dried, material in the Brabender Plasticorder at 60 rpm with no external heat. Samples were then oven cured at 80° C. for 15-30 minutes.

The above compositions were evaluated for their ability to adhere to a metal surface (as might be encountered in the tire by a puncturing nail). Using an Instron Tensile Tester fitted with fixtures designed for the test, the steel probe of the Tester was brought against the surface of a 0.18 inch thick sheet of sealant composition and held at predetermined loading for a specified time before being pulled away from the surface at the various rates as specified below. The energy expended in separating the probe from the sealant was measured and recorded. The data are reported below (wherein the separation rate is in terms of speed of the Instron crosshead and the separation energy is in joules, with greater adhesion being indicated by greater separation energy).

|  | Separation Rate | | | | | |
| --- | --- | --- | --- | --- | --- | --- |
|  | 2 inches/minute | | | | 20 inches/minutes | |
| Compressive Load, lbs | .5 | 1 | 3 | 5 | 1 | 5 |
| Example 29 | .25 | .21 | .33 | .41 | .51 | 1.05 |
| Example 30 | .39 | .30 | .53 | .70 | .68 | 1.61 |

The above data indicates superior adhesion-to-metal characteristics and is significantly better than is obtained on testing of a commercially available sealant composition.

The aforementioned cured material is readily pressed against a tire inside wall to fix it in place to form a puncture-sealing tire with a puncture-sealing layer with excellent adherence properties and resistance to migration. Typically, the sealant is used to protect the crown area of the tire (i.e., the area in back of the tread from shoulder to shoulder). In some cases, it can extend from the middle portion of one of the side walls to the middle portion of the other. In extreme cases, the sealant material can extend from bead to bead on the inner surface of the tire.

The compositions of Examples 29 and 30 also demonstrate excellent resistance to migration, puncture filling properties and resistance to blow through after filling and sealing.

Good results are also obtained when up to 70% of the EPDM is replaced by one or more other network-forming polymers, e.g. polybutadiene, hydrogenated polybutadiene, butyl rubber, halo butyl rubber, acrylonitrile-butadiene copolymer, styrene butadiene copolymer, natural rubber, and cis-polyisoprene.

Good results are also obtained when the polybutene is replaced with other low molecular weight ($\overline{Mn}$ of about 500 to 5000) tackifiers such as ethylene-propylene copolymer, ethylene-propylene-diene terpolymer, polybutadiene, hydrogenated polybutadiene, butyl rubber, polypropylene, acrylonitrile-butadiene copolymer, styrene-butadiene rubber and depolymerized natural rubber.

This invention and compositions made according to it find use in many applications where elastomeric compositions are cured, particularly in situ. Specific areas of use besides tire sealants used to coat the insides of puncture self-sealing vehicle tires include roofing compounds and caulking compositions. Other areas of utility will be apparent to those skilled in the art upon careful study of this specification.

While the foregoing describes certain preferred embodiments of the invention, modifications will be readily apparent to those skilled in the art. Thus, the scope of the invention is intended to be defined by the following claims.

We claim:

1. An improved method of curing of an elastomer composition comprised of at least one elastomeric synthetic or natural polymer containing at least about 0.1 mole % unsaturation with a curing system comprising:
   a) about 0.01 to 20 phr of at least one solid organic peroxide compound,
   b) about 0.01 to 10 phr of at least one quinoid vulcanization accelerator, and
   c) about 0.1 to 20 phr of a select polar solvent accelerator;

which method comprises supporting said peroxide compound on an inert excipient material chosen from the group consisting of wheat starch based, inorganic phosphate bases and combinations thereof and having a maximum average particle size of 50 microns before combining the peroxide with the elastomeric polymer.

2. The method as recited in claim 1, wherein the select polar solvent accelerator is selected from the group consisting of methanol, ethanol, propanol, butanol, n-hexanol, n-heptanol, n-octanol, cyclopentanol, 4-methyl cyclohexanol, t-amyl alcohol, benzyl alcohol, butanediol, cyclohexanone, acetophenone, an aqueous solution of sodium hydroxide, an aqueous solution of phosphoric acid, benzaldehyde, benzonitrile, acetic acid, tetrahydrofuran, dimethylacetamide, dimethylformamide, dimethyl sulfoxide and diethyl succinate.

3. The method as recited in claim 1 wherein the curing system comprises about 0.5 to 10 phr of at least one solid organic peroxide and about 0.5 to 5 phr of at least one select polar solvent accelerator.

4. The method as recited in claim 3 wherein the elastomer composition is selected from the group consisting of natural rubber, butyl rubber, ethylene-propylene terpolymer, polybutadiene, butadiene-styrene copolymers, butadiene-acrylonitrile copolymers, polyisoprene, isoprenebutadiene copolymers, hydrogenated or halogenated rubbers, and mixtures thereof.

5. A method as recited in claim 4 wherein the inert excipient material has a particle size of less than ten microns and the peroxide is benzoyl peroxide.

6. An improved curing system for curing an elastomeric composition comprised of at least one elastomeric synthetic or natural polymer containing at least about 0.1 mole percent unsaturation, said curing system comprising:
   a) about 0.01 to 20 phr of at least one solid organic peroxide compound,
   b) about 0.01 to 10 phr of at least one quinoid vulcanization accelerator, and
   c) about 0.01 to 20 phr of a select polar solvent accelerator;

wherein the improvement comprises supporting the peroxide compound on an inert excipient material chosen from the group consisting of wheat starch bases, inorganic phosphate bases and combinations thereof having a maximum average particle size of 50 microns.

7. The improved curing system recited in claim 6 wherein the peroxide is benzoyl peroxide.

* * * * *